United States Patent [19]

Ripa et al.

[11] 4,026,847

[45] May 31, 1977

[54] METHOD OF PARTIALLY CONVERTING WOOD INTO A LIGNIN PLASTIC POLYMER

[75] Inventors: Rodolfo Ripa; Alberto Garcia, both of Valparaiso, Chile

[73] Assignee: Universidad Tecnia Federico Santa Maria, Valparaiso, Chile

[22] Filed: May 13, 1975

[21] Appl. No.: 577,038

[52] U.S. Cl. .............................. 260/17.2; 427/381; 427/441

[51] Int. Cl.² .......................................... C08L 1/00

[58] Field of Search .......... 260/17.2; 427/382, 441, 427/381

[56] References Cited

UNITED STATES PATENTS

| | | | |
|---|---|---|---|
| 1,382,103 | 6/1921 | Lyon | 427/441 |
| 1,892,658 | 12/1932 | Wiezevich | 427/441 |

OTHER PUBLICATIONS

Chem. Absts., vol. 70, (1969), 5289 f, "Dimensional Stability of Wood Samples by Synthetic Resin," Sosnina et al.

Chem. Absts., vol. 71, (1969), 40452w, "Polycondensation —phenol —formaldehyde —woodlignin," Krasnoselov.

Chem. Absts., vol. (1970), 46875z, "Chemical Wood Plastics," Kalnins.

Chem. Absts., vol. (1971), 100,745t, "Wood Plastics—Modified Wood—Properties," Muzhits.

*Primary Examiner*—Edward M. Woodberry
*Attorney, Agent, or Firm*—Brisebois & Kruger

[57] ABSTRACT

Method of partially converting wood into plastic material by impregnating the wood with a phenol and substances which form a reaction product which forms a prepolymer with the lignin in the wood, heating said impregnated wood to form said reaction product and pre-polymer, and thus applying further heat and pressure to said impregnated wood to form a copolymer between said pre-polymer and the lignin in said wood.

9 Claims, No Drawings

METHOD OF PARTIALLY CONVERTING WOOD INTO A LIGNIN PLASTIC POLYMER

SUMMARY OF THE INVENTION

This invention relates to a process of converting wood into a semiplastic material by taking advantage of the high native lignin content of natural wood.

As is well known in the art, the different types of woods currently in use have a lignin content of up to 29%.

The lignin molecule is a large one and due to its polyphenolic character, may form free radicals and may be reacted with aldehydes, phenols and bases.

The inventors have now found a process in which, by taking advantage of the substantial reactivity of the lignin molecule, certain polymerizable compounds known in the art as "taxogens" are introduced into the wood. These compounds form macromolecular compounds by combining with the native lignin, which in this way is converted into a copolymerized plastic in situ, the volume of which may amount to more than 40% than that of the wood so transformed, and imparts thereto the properties of both wood and plastic, at the same time.

Various methods of impregnation of wood with dissolved or other forms of plastic, are known in the art, but said plastics are synthesized previous to their injection into the wood and, so far as applicants are aware, they have never before been copolymerized with native lignin in situ.

The method according to the invention constitutes an improvement with respect to the methods of the prior art, since it makes possible the use of up to 29% of the pre-existing natural lignin content in wood. Another improvement, provided by the invention, resides in the use of taxogens having a molecular weight less than 200, and which are consequently able to penetrate and spread homogeneously throughout the wood in contrast with the slow and difficult penetration into wood of commonly used plastics, which is due to the very large and heavy molecules characteristic of said polymers. It is usually sufficient to introduce about 15% of taxogens into the wood in order to obtain a copolymer in situ which constitutes up to one half of the converted wood substance.

The wood so transformed has improved properties as follows: increased density, increased hardness, and higher dimensional stability, as well as increased resistance to weathering and to the attack produced of acari, insects, termites, fungi or the like, and in addition, it becomes fire retardant. Furthermore, the treated surfaces are perfectly polished and shiny, which particular characteristic enhances the aesthetic value of the product.

The following examples illustrate the method of the invention.

EXAMPLE 1

Small pieces of wood squared to have a cross-section of about 1 inch × 1 inch made of "Pinus insignis" wood having a specific gravity of 0.45 g/c.c. and a hardness of 2.5° Brinell, were impregnated under vacuum during 5 minutes, with a solution containing 560 parts of methanol, 172 parts of cresols, 148 parts of formaldehyde, 16 parts of ammonia, 2 parts of urotropine, and 102 parts of water by weight.

After removing the excess solution, the test pieces were heated at 95° C to recover the remaining solvent and part of the taxogens, to produce a reaction product which condenses with the phenol in said solution to form a pre-polymer (resol) and were finally subjected to a pressure of 100 kg/cm$^2$ in a hydraulic press for 30 min. at 160° C to form a copolymer between the pre-polymer and the lignin in the wood. It was found convenient to use highly polished steel plates inserted between each two adjacent test pieces and the result was transformed pieces with the aspect and characteristics of a plastic. Their weight was increased by 85%, their density was 0.85 g/cm$^3$, their hardness amounted to 9.3° Brinell, and an ASTM combustion test left a residue of 17.8% which, when compared with the 7.6% left when the original wood was subjected to the same test, which implied a substantial improvement in fire retardation showing that the converted product is 57.3% more fire retardant than the original wood. The experts in the art will readily understand the importance of this improvement when the converted wood is employed as a building material.

While a pressure of 100 kg/cm$^2$ for 30 min. at 160° C has been given in this example, it will be appreciated that the temperature is dependent upon the particular taxogens used and the kind of wood treated, and that the pressure and the time during which pressure is applied may vary within the following limits: 80–140 kg/cm$^2$ for 25–80 min.

EXAMPLE 2

Wooden test pieces identical to the ones used in Example 1 were impregnated in the same way as in Example 1, but were subsequently introduced into a paraffin bath and heated at 165° C. The solvents as well as the excess taxogens were recovered and after 1 hour the pieces were removed, the excess paraffin was drained out and the pieces were subsequently allowed to cool at room temperature. The surfaces of the treated pieces were not polished as were the ones in Example 1, but their specific gravity, hardness and flame resistance were about the same as the ones described in Example 1.

The chemical reactions involved in both examples may be summarized as the condensation of the cresols with formaldehyde, promoted by ammonia at about 100° C, the product of said reaction being a pre-polymer, Resol, which pre-polymer enters into combination with the native lignin in the treated wood, said reaction being possible due to the phenolic groups contained in the lignin molecule. The resulting product is a co-polymer which ultimately becomes a Resite type plastic i.e. one comparable to Bakelite, which thermosets at about 160°–165° C. Polymerization catalysts such as hexamethylene tetramine may be used to promote the polymerization, and other inorganic bases may be used instead of ammonia.

The converted wood test pieces obtained in Example 1 and 2 could be sawed, nailed, perforated, planed, machined and polished in much the same way as any piece of hard wood.

A polishing operation was unnecessary in the case of the product of Example 1. The hard-polished surfaces of the final product constitutes a valuable property thereof when said material is employed for many purposes (floor tiles, pieces of furniture, building materials) in which the aesthetic viewpoint should be taken into account.

The final product in Example 2 does not have polished surfaces but the process is considerably more economical and since the physical properties (hardness, specific gravity, fire retardation and the like) are improved in about the same degree as with the process of Example 1. The second process is also suitable for continuous production, since there is no need to work under pressure but merely at atmospheric pressure, in a paraffin bath at 150°–180° C.

Comparative economic aspects of the process according to the invention and those of the prior art Since one of the objects of the process according to the invention is to make use of the native lignin already contained in the wood to be treated (about 26–29% by weight of the original wood) by combining this with chemical products in order to form a co-polymer which thereafter constitutes about 40–46% of the treated wood, this process is far more economical than the various processes of impregnation of wood already known in the art.

In a paper "The Chemical Modifications of Wood", by B. S. Bryant et al. (Washington Univ. Seattle) published in *Forest Products Journal* Vol. 16, No. 2, page 23, a number of impregnation of wood with monomeric plastics are described and the many difficulties encountered in the program penetration thereof into the wood cells are described.

The process according to the invention overcomes these difficulties since the taxogens employed are of low molecular weight and very high mobility, as compared with larger molecules of plastic materials which penetrate into wood at a very slow rate. Suitable taxogens include cresols, substituted phenols, furfural and acetaldehyde.

Furthermore none of the prior art processes employs native lignin as a component of the resulting plastic.

In "Modern Plastics", Volume No. 131, May 1967, pp. 354–356, the processes of manufacture employed by the "American Novawood Corp." of Lynchburg, Va. are described. They consist mainly in the impregnation of wood with plastics such as methylmethacrylate, P.V.C. plastics, and styrene plastics by means of catalysts and further irradiation with $Co^{60}$ isotopes. The total period of the process cycle is 24 hours.

The weight of the treated product is increased by 100% as compared with that of the original wood, which percentage means that plastics have been introduced in an amount about equivalent to the original weight of the starting wood.

The improvements provided by the process of the present invention are readily understood because the cost of a mere 12–18% increase over the weight of the original wood, and to obtain 40–45% of the plastic copolymer in the final product, is considerably lower than the one required by the raw materials consumed in the prior art process. Furthermore, the total length of time of the process is of 25–40 min., as compared with 24 hours or more, and this is of considerable importance in the overall economies of the process.

Finally, applicants' process does not require expensive apparatus or materials (radioactive isotopes and the apparatus for dealing therewith) which factor is of the utmost importance for determining the feasibility of carrying out a certain process on an industrial scale when it is not desirable or possible to make a large investment.

What is claimed is:

1. The method of partially converting wood into a plastic material which comprises the steps of
   a. impregnating said wood with a liquid containing taxogens having a molecular weight less than 200 which form a pre-polymer that will react with lignin in the wood when heated to a sufficient temperature,
   b. heating said impregnated wood to a first temperature sufficient to remove any excess of said taxogens from the wood and form said pre-polymer, and
   c. finally heating said impregnated wood to a temperature and for a time sufficient to cause a reaction resulting in the formation of a co-polymer between the pre-polymer and the lignin in the wood.

2. The method of claim 1 in which said impregnated wood is subjected to pressure during heating.

3. The method of claim 2 in which said wood is subjected to a pressure of about 100 kg/cm² for about 30 minutes.

4. The method of claim 1 in which said impregnated wood is heated in a paraffin bath.

5. The method of claim 4 in which said impregnated wood is heated in said bath for about an hour.

6. The method of claim 1 in which said liquid is a solution containing cresol, formaldehyde and an inorganic base which promotes a reaction between said cresol and formaldehyde when heated.

7. A product produced by the process of claim 1.

8. The method of claim 1, in which said taxogens comprise a phenol and other taxogen compounds which will copolymerize with said phenol.

9. The method of claim 1, in which said taxogens include cresols, substituted phenols, furfural and acetaldehyde.

* * * * *